Feb. 5, 1963 C. P. HOSTETLER 3,076,485
FRUIT LOADER
Filed Oct. 14, 1960 2 Sheets-Sheet 1
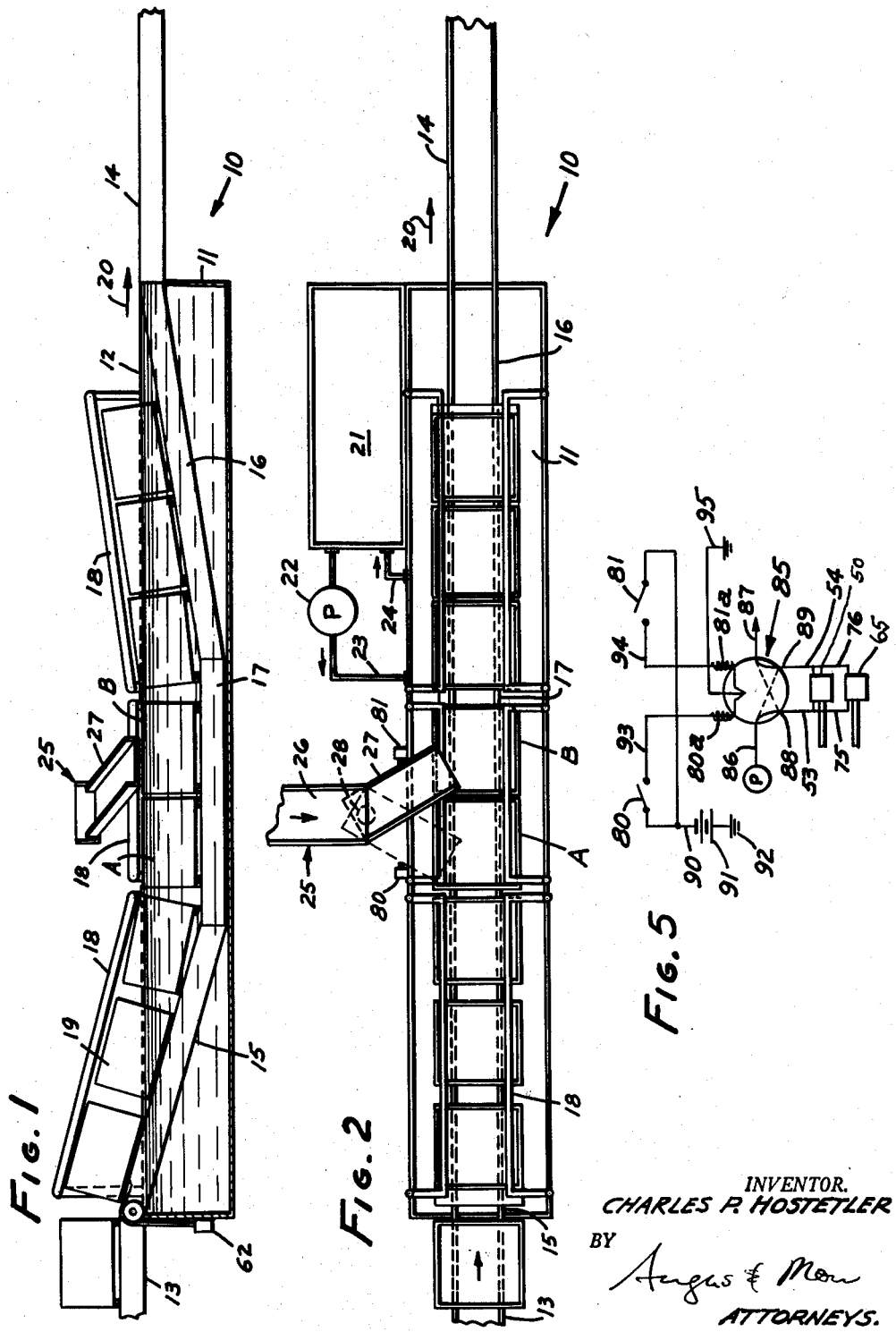
INVENTOR.
CHARLES P. HOSTETLER
BY
ATTORNEYS.

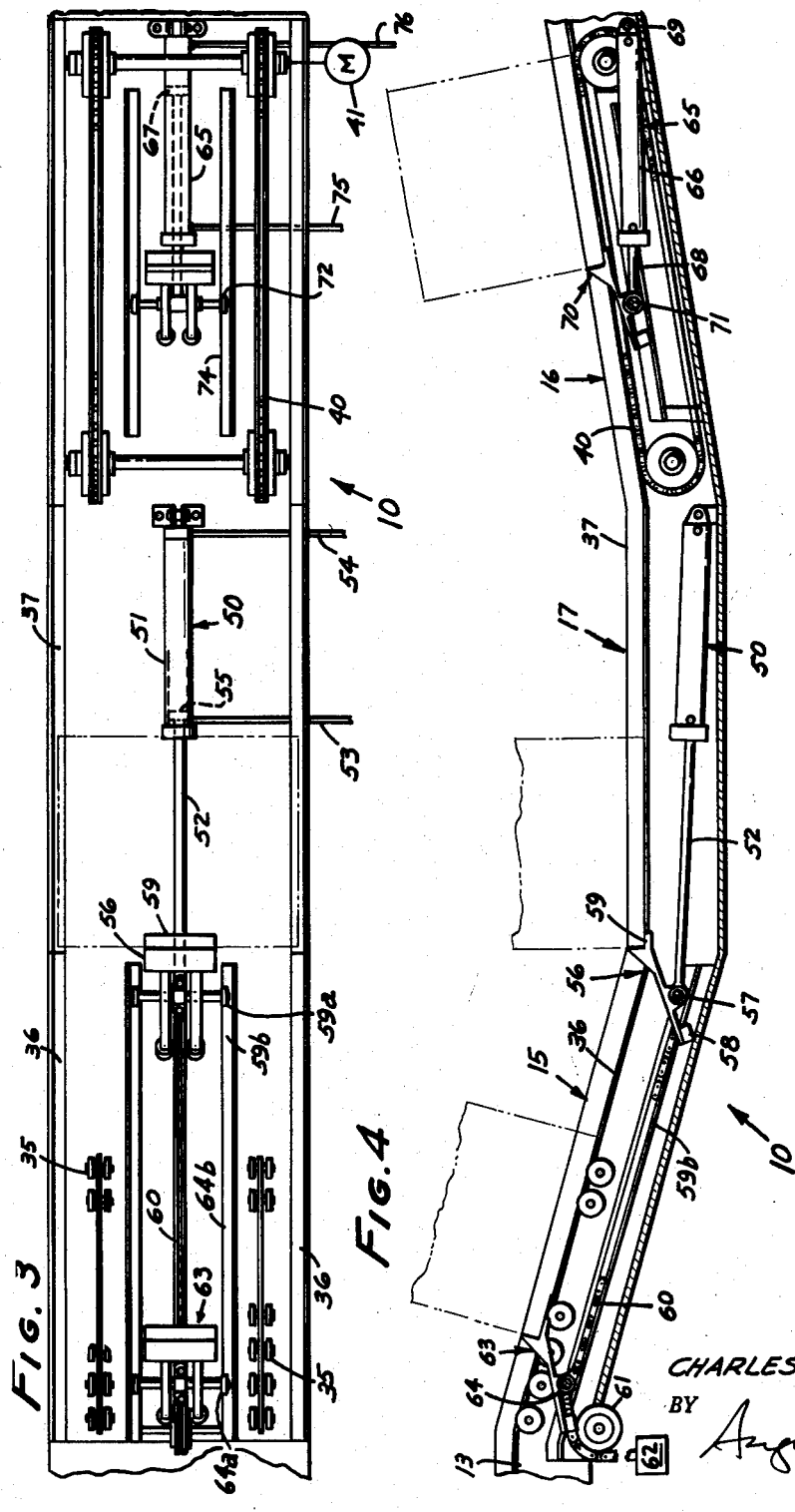

United States Patent Office 3,076,485
Patented Feb. 5, 1963

3,076,485
FRUIT LOADER
Charles P. Hostetler, Redlands, Calif., assignor to Fruit Equipment Service, Redlands, Calif., a corporation of California
Filed Oct. 14, 1960, Ser. No. 62,633
8 Claims. (Cl. 141—82)

This invention relates to a machine for placing fruit in boxes.

In the handling of fruit, such as peaches, for example, it is customary to take fruit from field boxes, clean it, and run it through a field station where it is sized, passed over a grading table to remove sub-standard fruit, and past Department of Agriculture inspection, thereby to produce a quantity of first-grade fruit suitable for immediate use by canneries. Such field stations must handle fruit in sizable quantities and at fast rates at harvest time. It is necessary not only to give the fruit a thorough inspection and rapid handling, but also the handling ought not to damage the fruit. Therefore, it is an object of this invention to provide a machine forming a portion of a system suitable for a field station in which the finally-graded and inspected fruit can be loaded into boxes in which they can be carried to the cannery.

A difficult problem in such a handling process is that the fruit, even though sometimes picked and handled while still quite hard, will bruise fairly easily. Once the fruit has been graded and inspected, it ought not to be given rough treatment, but ought to be handled as gently as possible to produce highest quality canned products. However, it is still necessary to handle the fruit rapidly in order that the requirements of the canneries for high-volume supply of fruit to be canned can be met. This machine provides a means for letting fruit be dumped very rapidly into a deep box after the grading and inspecting process is concluded, such means comprising dumping the fruit into a water-filled box.

This particular process, while desirable, includes several distinct difficulties not the least of which is that many fruits, particularly peaches, which are advantageously handled in this manner, and also the wooden boxes which are commonly used, have a specific gravity almost equal to that of water and therefore do not tend to sink in water. It is an object of this invention to provide means for delivering the fruit into a submerged box so that the box can be quickly filled.

This invention is carried out in combination with a tank having the water level therein which is nearly up to that of the height of the boxes to be filled with fruit. A pair of oppositely-aligned ramps extend from elevations above to elevations beneath the water level, there being an ascending and a descending ramp. The lower ends of the ramps are spaced apart by a central section. When wooden boxes are to be used, a railing overhangs the ramps and central section to hold the boxes submerged. Means are provided for advancing the boxes down one ramp, across the central section, and up the other ramp, and discharge means are provided over the central section for discharging fruit into a box at the central section.

According to a preferred but optional feature of the invention, the discharge means comprises a swingable spout, the central section being proportioned to receive a plurality of boxes whereby the spout can be swung back and forth to discharge fruit into more than one box on the central section.

According to another preferred but optional feature of the invention, a pair of limit switches are provided at the extremes of the spout swing movement to start and stop the means for advancing the boxes across the central section.

The above and other features of this invention will be fully understood from the following detailed description and the accompanying drawings, in which:

FIG. 1 is a side elevation, partly in cutaway cross-section showing a machine according to the invention;
FIG. 2 is a top view of FIG. 1;
FIG. 3 is a top view of FIG. 1 with the boxes removed to show the mechanism;
FIG. 4 is a more detailed view of FIG. 1; and
FIG. 5 shows a control circuit useful in actuating the motors in the device of FIGS. 1–4.

A machine 10 according to the invention is shown in FIG. 1 which includes a tank 11 which has a water level 12. When the device is in operation, the water level is ordinarily maintained at an elevation about even with the top of the box to be filled. An on-ramp 13 and an off-ramp 14 are provided at opposite ends of the tank.

Within the tank there are a pair of aligned ramps: a descending ramp 15 and an ascending ramp 16. The upper ends of ramps 15 and 16 connect with the innermost ends of ramps 13, 14, respectively. Their lower ends below the water line are spaced apart by a central section 17. This central section is long enough to receive more than one, and preferably two of the boxes to be filled, but may be only long enough for one, or may accommodate more than two, if the dimensions of the area in which the machine is set up require it.

An overhanging rail 18 overhangs ramps 15, 16 and also central section 17 to hold the boxes submerged when the boxes used are made of wood or some floating material. If metal boxes were used, or if the wooden boxes were weighted or cleated down, the overhanging rail could be dispensed with. However, in commercial operations, wooden boxes are more frequently used, so that rail 18 will usually be needed. A plurality of boxes 19 are shown progressing in the direction of arrow 20 through the machine.

FIG. 2 shows an ice tank 21 adjacent to tank 11 having a circulating pump 22 with pipe connections 23, 24 to tank 11. Pump 22 will circulate water in tank 11 over ice contained in tank 21 thereby lowering the temperature of the water in tank 11. This is advantageous in handling many types of fruit, particularly peaches, in which it has been found that if, within a reasonable time after picking the temperature of the peaches is quickly and appreciably lowered, the chance for rot to form in the peach by the time it reaches the cannery, is drastically reduced.

Fruit discharge means 25 are provided adjacent to tank 11. These discharge means include a conveyor belt 26 which discharges fruit to a swingable spout 27, this spout being mounted to a pivot bearing 28 at the side of tank 11. This spout can swing between the extreme positions, letter box positions A and B in FIG. 2, and may also assume any position therebetween. The spout receives fruit from the conveyor belt, and its end overhangs the boxes standing on the central section so as to dump fruit thereinto. It will be seen that swinging the spout to either of its extreme positions will enable the fruit to be delivered to boxes standing at either of the positions. Also, the spout can be swung along to continue to fill a box as it moves from box position A to box position B.

The descending ramp is provided with a roller track 35 near its upper end where boxes still out of the water can roll down to ultimately reach lower tracks 36, 37 which extend along the bottom of the tank and partway up the ascending ramp. The roller track holds the box up off the lower tracks for the initial distance down the descending ramp so as to allow the boxes to coast down. The boxes would move with greater difficulty over the tracks 36 because of frictional effects if they merely slid along them.

When the boxes are not filled with fruit, they will tend to float and move along the overhanging rails, and when they are full they will tend to move along the lower track, or hover between the upper and lower tracks. The ascending ramp is provided with a driven chain track 40 which tends to lift boxes up this ramp after they have moved far enough up the ascending ramp that their buoyancy and the buoyancy of their contents no longer hold them up in the water. Chain track 40 is operated by motor 41.

Means are provided for advancing the boxes through the machine which comprise a first motor 50 which includes a hydraulic cylinder 51 with an associated piston rod 52, the rod being reciprocable by virtue of fluid introduced through conduits 53 or 54 on opposite sides of piston 55 to which the rod is fixed. The piston rod carries a cleat 56 shown in FIG. 4 which is pivoted at hinge 57. The cleat has a counterweight 58 on one side of the hinge, and a bracket 59 on the other side. The counterweight lifts the bracket into a position such that it engages a box when moved to the right in FIG. 2, but the hinged arrangement enables the cleat to slide backward underneath the box when it moves to the left in that figure. Wheels 59a are mounted to the hinge and roll along tracks 59b to keep the cleat at a proper elevation.

A chain 60 is connected to the hinge, and extends to the left in FIG. 4 where it passes over a sprocket wheel 61 and hangs down to suspend a counterweight 62, which counterweight tends to keep chain 60 taut. A second cleat 63 is fastened by hinge 64 to chain 60 at a location spaced from cleat 56, so that it will operate to pull boxes down the descending ramp while cleat 56 pulls boxes along the central section. Cleat 63 is identical to cleat 56. Its wheels 64a roll along tracks 64b.

A second motor 65 comprises a cylinder 66, a piston 67, and a piston rod 68 fixed to the piston. Cylinder 66 is mounted to the ascending ramp by a pivoted hinge plate 69 so that the piston end of the motor can rise and fall. The end of the rod carries a cleat 70 which is mounted by hinge 71 to the piston rod. Cleat 70 is identical to cleat 56. The hinge carries wheels 72 (see FIG. 3) which roll along tracks 74. Motor 65 has conduits 75, 76 connected to the cylinder at opposite sides of the piston to cause axial reciprocation of the rod.

The swingable spout contacts at the extremes of its angular swing, as shown in FIG. 2, a pair of limit switches 80, 81. These limit switches are shown in FIG. 5, which figure illustrates a circiut for controlling the motors. Switches 80, 81 are provided for controlling the fluid flow passages through a solenoid valve 85. The solenoid valve is a snap-acting selector valve whose properties are to connect a selected one of its motor supply ports 88, 89 to a pressure port 86, and the other to an exhaust port 87, holding the last setting until changed by a later actuation. Conduits 53 and 75 are connected to port 88, and conduits 54 and 76 are connected to port 89.

One flow adjustment arranged by closure of switch 80 which actuates coil 80a is shown in solid line in the valve. The other adjustment of the valve caused by closure of switch 81 which actuates coil 81a is shown in dotted line. The energizing of one coil or the other in this solenoid valve will cause the valve to supply pressure to one side or the other of the motors, depending on which limit switch is closed. The particular arrangement will be retained until the other limit switch is closed, whether the first switch is kept closed or not.

Switches 80 and 81 have one of their terminals connected to a bus 90 which is in turn connected to a source of electricity 91 which is ground at 92 in a D.C. single-wire system. The other terminal of switch 80 is connected by lead 93 to coil 80a of the solenoid valve, while the other terminal of switch 81 is connected by lead 94 to coil 81a of the solenoid valve. The coils are grounded at 95.

The operation of this device will now be described.

The conveyor belt will be placed in operation and the machine will be filled with boxes as shown in FIG. 1. Certain boxes will be engaged by the cleats to move them along. Boxes not engaged by the cleats will be pushed along by boxes that are, or will slide down the upper end of the descending ramp or ride the chain track up the open end of the ascending ramp. Assume the initial position of the device is that shown in FIG. 2 where the swingable spout is shown discharging fruit at box position B. Limit switch 81 will have been closed so that pressure has been placed in conduits 54 and 76, thereby having moved the cleats to the extended position of the rods shown in FIG. 4. Pressure may be left on in the cylinders without detriment to the device. In moving to the left in FIG. 4, the cleats will have slid under the successive boxes. When they reach their left-hand extreme position, they are as shown in FIG. 4, ready to move boxes along to the right.

To do this, the operator waits until the box at position B is full (the delivery belt delivers fruit continuously). At that time, the operator will swing the spout to the position shown in dotted line in FIG. 2, (box position A) contacting limit switch 80. This contact energizes the circuitry of FIG. 5 to switch over the selector valve to place conduits 53 and 75 under pressure, thereby operating the motors to move all the cleats to the right in FIG. 4 and shifting the boxes along. The operator will follow the box from position A with the spout filling the box as it moves, until finally the box will have reached the position shown as box position B, at which time the swingable spout will strike limit switch 81 thereby reversing the motor position, leaving the boxes in the advanced positions, returning the cleats to the positions shown in FIG. 4, and awaiting the next closure of switch 80 to move the boxes along. Thus by the simple act of swinging the spout from side to side, the operator is able to continuously fill boxes and arrange for movement of the boxes along the bottom of the tank while still being certain that there is always a box directly under the spout. It is, of course, within the scope of this invention to provide other means for contacting the limit switches instead of the pivotal spout, such as a selector handle still being within the scope of this invention. However, it is preferable for the spout to act as the selector handle, for then the spout automatically discharges fruit into boxes capable of receiving it.

By discharging the fruit into water, the fall of the first fruit into each box is cushioned by the water. Even though this fruit will tend to float, the impact of other fruit on top of it is an elastic impact, with the lower fruit easily moving away from the upper fruit. It will never be squashed, as it would if the first fruit simply rested on the hard bottom of the box. Thus the fruit fall is cushioned, even when some fruit drops atop other fruit. In no case does the fruit ever fall a distance greater than that between the spout and the surface of the water, and sometimes the fall is less. This is a great improvement over fillers which simply drop the fruit down to the bottom of a box and then onto stacked up fruit.

This invention is not to be limited by the embodiment shown in the drawings and described in the description which is given by way of example and not of limitation, but only in accordance with the scope of the appended claims.

What is claimed is:

1. A machine for loading fruit and the like into boxes under water comprising: a tank having a water level; a pair of oppositely aligned ramps extending from elevations above to elevations beneath the water level, a level central section beneath the water level and spacing apart the lower ends of the ramps; means for advancing the boxes down one ramp, across the central section, and up the other ramp comprising a motor and a cleat driven by said motor, said cleat engaging at least one box to move it when actuated by the motor; discharge means over the central section for discharging fruit into a box at said central section comprising a swingable spout, the central section being proportioned to receive a plurality of boxes whereby the spout can discharge fruit into more than one box on said central section; a control circuit for energizing the motor to actuate the cleat comprising a pair of limit switches actuable by the spout at individual extremes of its movement, each of which limit switches causes the motor to operate in an opposite direction, whereby when one limit switch is contacted by the spout, the motor is caused to advance the boxes and when the other is contacted by the spout, the motor is reversed to return to a position where the cleat will engage a successive box.

2. A machine according to claim 1 in which the motor comprises a first hydraulic cylinder and piston rod assembly which drives a pair of cleats, one cleat pulling boxes down the descending ramp and the other pulling boxes across the central section, and a second hydraulic cylinder and piston rod assembly driving a cleat which pulls boxes up the ascending ramp.

3. A machine according to claim 2 in which the ascending ramp is provided with a driven chain track for aiding the removal of the boxes from the machine.

4. A machine for loading fruit and the like into boxes under water comprising: a tank having a water level; an ice tank; pump and conduit means for pumping water between said two tanks; a central ramp section; an ascending ramp and a descending ramp which are axially aligned and extend from elevations above to elevations beneath the water level, their lower ends being spaced apart by the level central section; motor means for advancing the boxes down the descending ramp, across the central section and up the ascending ramp, comprising a pair of piston-cylinder assemblies, each carrying cleats engageable with boxes in the advancing direction and disengageable therefrom in the other direction; discharge means over the central section for discharging fruit into a box at said central section, said discharge means comprising a swingable spout, the central section being proportioned to receive a plurality of boxes whereby the spout can be swung to discharge fruit into more than one box on said central section; control means controlling operation of the motor means as a function of the position of the swingable spout whereby swinging the spout to a first position causes the motor means to advance the boxes, and swinging the spout to another of its positions stops the motor means.

5. A machine according to claim 4 in which a driven chain track is provided on the ascending ramp for aiding the removal of boxes from the machine.

6. A machine according to claim 4 in which a first one of the motor means is provided on the ascending ramp for moving the boxes up the ramp until they rest on the driven chain track, and in which the second of the motor means is disposed in the central section for moving a cleat across said central section.

7. A machine according to claim 6 in which the second motor means is additionally provided with a second cleat which moves along the descending ramp in unison with the cleat moved along the central section, for pulling boxes down the descending ramp.

8. Apparatus according to claim 7 in which all motors comprise reversible fluid motors, and in which the control means includes a selector valve having a pair of flow connection conditions adapted to connect either side of the motors to a source of fluid under pressure and thereby determine the direction of movement, and in which each switch is adapted to set the selector valve in one or the other of its flow connection conditions.

References Cited in the file of this patent

UNITED STATES PATENTS

| | | |
|---|---|---|
| 795,124 | Hetzel | July 18, 1905 |
| 969,238 | Wright | Sept. 6, 1910 |
| 1,234,131 | Cleveland | July 24, 1917 |
| 2,265,702 | Sime | Dec. 9, 1941 |
| 2,884,963 | Erndt | May 5, 1959 |